US011239572B2

(12) United States Patent
Hu et al.

(10) Patent No.: US 11,239,572 B2
(45) Date of Patent: Feb. 1, 2022

(54) BEAM-STEERING RECONFIGURABLE ANTENNA ARRAYS

(71) Applicant: SMART ANTENNA TECHNOLOGIES LTD, Birmingham (GB)

(72) Inventors: Sampson Hu, Birmingham (GB); Qing Liu, Birmingham (GB); Liang Wan, Birmingham (GB)

(73) Assignee: Smart Antenna Technologies Ltd., Birmingham (GB)

( * ) Notice: Subject to any disclaimer, the term of this patent is extended or adjusted under 35 U.S.C. 154(b) by 50 days.

(21) Appl. No.: 16/482,172

(22) PCT Filed: Jan. 31, 2018

(86) PCT No.: PCT/GB2018/050285
§ 371 (c)(1),
(2) Date: Jul. 30, 2019

(87) PCT Pub. No.: WO2018/142132
PCT Pub. Date: Aug. 9, 2018

(65) Prior Publication Data

US 2020/0203853 A1 Jun. 25, 2020

(30) Foreign Application Priority Data

Jan. 31, 2017 (GB) ..................................... 1701611
Jan. 31, 2017 (GB) ..................................... 1701612

(51) Int. Cl.
*H01Q 1/24* (2006.01)
*H01Q 21/28* (2006.01)
(Continued)

(52) U.S. Cl.
CPC ............. *H01Q 21/28* (2013.01); *H01Q 1/243* (2013.01); *H01Q 3/24* (2013.01); *H01Q 13/20* (2013.01); *H04B 7/0695* (2013.01)

(58) Field of Classification Search
CPC .......... H01Q 1/243; H01Q 3/24; H01Q 13/20; H01Q 21/28; H01Q 25/00; H04B 7/24; H04B 7/0602; H04B 7/0695
See application file for complete search history.

(56) References Cited

U.S. PATENT DOCUMENTS 8,836,594 B2 * 9/2014 Rothwell ............... H01Q 3/247 343/731
2006/0281423 A1 * 12/2006 Caimi .................... H01Q 9/045 455/129
(Continued)

FOREIGN PATENT DOCUMENTS

EP 1564896 A1 8/2005
GB 2532315 A 5/2016
(Continued)

OTHER PUBLICATIONS

International Search Report and Written Opinion for corresponding PCT Application No. PCT/GB2018/050285, dated Apr. 25, 2018, 17 pp.
(Continued)

*Primary Examiner* — Jimmy T Vu
(74) *Attorney, Agent, or Firm* — Shumaker & Sieffert, P.A.

(57) ABSTRACT

There are disclosed antenna arrays for portable electronic devices. In one aspect, the antenna array comprises at least two antennas, each antenna comprising at least two radiating elements; and at least two control networks each comprising a plurality of impedance matching circuits and RF switches, each antenna being connected to a respective control network. Each control network connects the radiating elements
(Continued)

of its respective antenna to a single RF port. Each antenna element is connected to a respective first RF switch in its respective control network allowing selection between different ones of the plurality of impedance matching circuits. Each port is connected to a respective second RF switch in its respective control network allowing selection between different ones of the plurality of impedance matching circuits. The impedance matching circuits are connected between the first RF switches and the second RF switch in each control network. In another aspect, the antenna array comprises a plurality of leaky-wave antennas; a plurality of control networks each comprising a plurality of impedance matching circuits and RF switches, each leaky-wave antenna being connected to a respective control network; and a digital control processor configured to send control signals to the control networks so as to control operation of the leaky-wave antennas. Each control network connects its respective leaky-wave antenna to a single RF port.

36 Claims, 12 Drawing Sheets

(51) Int. Cl.

| | |
|---|---|
| ***H04B 7/06*** | (2006.01) |
| ***H01Q 3/24*** | (2006.01) |
| ***H01Q 13/20*** | (2006.01) |

(56) References Cited

U.S. PATENT DOCUMENTS

2008/0258993 A1* 10/2008 Gummalla ......... H01Q 15/0086 343/876
2011/0248898 A1 10/2011 Rothwell et al.
2013/0002487 A1 1/2013 Hosoya et al.
2013/0050029 A1 2/2013 Xu et al.
2015/0249916 A1* 9/2015 Schlub .................. H01Q 1/243 455/419

FOREIGN PATENT DOCUMENTS

WO 2008115881 A1 9/2008
WO 2001129983 A3 10/2011
WO 2011114412 A1 6/2013
WO 2016097712 A1 6/2016

OTHER PUBLICATIONS

Martinez-Ros et al., Static and Electronic Shaping of the Radiated Electromagnetic Fields in Radial Arrays of Substrate Integrated Leaky-Wave Antennas, Proceedings of the 43rd European Microwave Conference, European Microwave Association, Oct. 6, 2013, pp. 1667-1670, XP03253570.
Combined Search and Examination Report for GB Application No. 1801592.5, dated Jul. 27, 2018, 7 pp.

* cited by examiner

CA2

| | |
|---|---|
| Type | Farfield |
| Approximation | enabled (kR >> 1) |
| Monitor | farfield (f=2.45) [2] |
| Component | Abs |
| Output | Directivity |
| Frequency | 2.45 |
| Rad. effic. | -0.0004826 dB |
| Tot. effic. | -2.386 dB |
| Dir. | 7.870 dBi |

BEAM-STEERING RECONFIGURABLE ANTENNA ARRAYS

This application is a national stage application under 35 U.S.C. § 371 of PCT Application No. PCT/GB2018/050285, filed 31 Jan. 2018, which claims the benefit of Great Britain Application No. 1701611.4, filed 31 Jan. 2017 and Great Britain Application No. 1701612.2, filed 31 Jan. 2017. The entire contents of the PCT/GB2018/050285, Great Britain Application No. 1701611.4 and Great Britain Application No. 1701612.2 are incorporated herein by reference in their entirety.

The present disclosure relates to an array of two or more antenna elements, each formed from a number of radiating portions, which when driven by way of an associated matching and switching network, can beam-switch to utilise the properties of differing radiation patterns by selecting different radiating elements or multiples of different radiating elements on each antenna in order to effect beam-steering.

The radiating elements can also be arranged in 3-dimensional space in various positions of angle of rotation and inclination about the origin of a sphere, in addition to traditional linear arrays.

The present disclosure also relates to a reconfigurable array of leaky-wave antenna elements, which can be arranged in three-dimensional space, about an origin, each with a number of tuneable components arranged on the conductor surface, in the direction of the travelling wave, whereby control of the tuneable elements can alter the angle of the main lobe of radiation from the antenna.

The tuneable components may be non-Foster components configured to de-couple the frequency dependence of the radiation main lobe angle. Alternatively, the leaky-wave antennas may be of a half-width type and may use switches for changing a beam angle, for example as described in co-pending UK patent application no GB1708811.3 filed on 2 Jun. 2017.

BRIEF SUMMARY OF THE DISCLOSURE

In the context of the present application, a "balanced antenna" is an antenna that has a pair of radiating arms extending in different, for example opposed or orthogonal, directions away from a central feed point. Examples of balanced antennas include dipole antennas and loop antennas. In a balanced antenna, the radiating arms are fed against each other, and not against a groundplane. In many balanced antennas, the two radiating arms are substantially symmetrical with respect to each other, although some balanced antennas may have one arm that is longer, wider or otherwise differently configured to the other arm. A balanced antenna is usually fed by way of a balanced feed.

In contrast, an "unbalanced antenna" is an antenna that is fed against a groundplane, which serves as a counterpoise. An unbalanced antenna may take the form of a monopole antenna fed at one end, or may be configured as a centre fed monopole or otherwise. An unbalanced antenna may be configured as a chassis antenna, in which the antenna generates currents in the chassis of the device to which the antenna is attached, typically a groundplane of the device. The currents generated in the chassis or groundplane give rise to radiation patterns that participate in the transmission/reception of RF signals. An unbalanced antenna is usually fed by way of an unbalanced feed.

A balun may be used to convert a balanced feed to an unbalanced feed and vice versa.

A reconfigurable antenna is an antenna capable of modifying dynamically its frequency and radiation properties in a controlled and reversible manner. In order to provide a dynamical response, reconfigurable antennas integrate an inner mechanism (such as RF switches, varactors, mechanical actuators or tuneable materials) that enable the intentional redistribution of the RF currents over the antenna surface and produce reversible modifications over its properties. Reconfigurable antennas differ from smart antennas because the reconfiguration mechanism lies inside the antenna rather than in an external beamforming network. The reconfiguration capability of reconfigurable antennas is used to maximize the antenna performance in a changing scenario or to satisfy changing operating requirements.

Viewed from a first aspect, there is provided antenna array for a portable electronic device, the antenna array comprising:

at least two antennas, each antenna comprising at least two radiating elements; and at least two control networks each comprising a plurality of impedance matching circuits and RF switches, each antenna being connected to a respective control network;

wherein each control network connects the radiating elements of its respective antenna to a single RF port; and wherein each control network is configured to allow selectable connection of each radiating element to the single RF port by way of different matching circuits.

In certain embodiments, each radiating element is connected to a respective first RF switch in its respective control network allowing selection between different ones of the plurality of impedance matching circuits. Each port may be connected to a respective second RF switch in its respective control network allowing selection between different ones of the plurality of impedance matching circuits. The impedance matching circuits may be connected between the first RF switches and the second RF switch in each control network.

The control network may be configured to be addressed directly by a digital control bus and an associated digital control processor. In certain embodiments, the antenna array is configured for connection to an RF frontend by way of RF signal lines connected to the RF ports. The RF front end may in turn be connected to a baseband processer, and the digital control bus may connect the baseband processor to the digital control processor. The digital control processor may be connected to and control the control networks of the antenna array.

The radiating elements may be disposed substantially radially about an origin in 3D space, or may be disposed in a substantially linear arrangement.

In some embodiments, the radiating elements may be arranged conformally within a portable device casing, which to say that the radiating elements are shaped or configured to conform to an internal shape of the casing. In some embodiments, the radiating elements may form part of the casing itself, for example edge portions of the casing.

The radiating elements may be configured as one or more of: i) free-standing metal conductors, ii) conductive patterns on a dielectric carrier using laser direct structuring techniques, or iii) conductive patterns on a flexible PCB, wrapped onto a dielectric carrier.

In certain embodiments, each antenna is provided with a proximity sensor. The proximity sensor, which may be a capacitive or other type of sensor, may be connected to the digital control processor such that, in response to sensing a particular proximity value or threshold, the digital control processor dynamically adjusts the antenna array so as to alter the radiated power or the radiation pattern, or even switches off one or more of the at least two antennas in response to sensing human tissue in close proximity to the array. For example, a transmission power of each antenna may be controllable as a function of an output of its associated proximity sensor.

In some embodiments, the digital control processor is configured to operate the first and second RF switches so as to allow the radiating elements to be driven either in an individual mode as unbalanced or chassis antennas, or in a combination mode as a balanced or dipole antenna. In certain embodiments, the radiating elements are not driven together in the individual mode.

The digital control processor may be configured to operate the first and second RF switches to dynamically change the antenna configuration in response to predetermined factors. The predetermined factors may include: specific absorption rate (SAR), total radiated power (TRP), channel quality, error rates, or similar communication strength or quality metrics In some embodiments, switching between the individual mode and the combination mode, or between different combination modes, produces differently-directed beam patterns during operation of the antenna array. The differently-directed beam patterns may be configured for beam-forming or MIMO applications.

In certain embodiments, each antenna comprises two radiating elements arranged orthogonally to each other so as to fit in a corner of a portable electronic device. The arrangement of at least two antennas may be configured to provide 2×2 or 4×4 MIMO in a laptop, tablet, or other mobile wireless device. The two radiating elements may be drivable together in a balanced mode, or each drivable individually in an unbalanced mode, so as to radiate with differently-directed beam patterns.

In the broadest sense, the current concept uses an array of two or more antenna elements, each formed from a number of radiating portions, which when driven via an associated matching and switching network, can beam-switch using the properties of differing main radiation lobe patterns, by selecting different, or multiples of different, radiating elements on each antenna element in order to implement simplistic beam-steering.

Dynamic reconfigurability of the array can ensure QoS, mitigate interference or jamming, enable MIMO techniques or keep equipment within SAR parameters (optionally with the use of a proximity sensor).

Certain embodiments enable the simple use of the radiation pattern for beam steering in place of complicated phased arrays.

Certain embodiments work in multiple environments and arrangements due to the reconfigurability of the antenna elements forming the array.

Certain embodiments provide a cost-effective way to integrate beam-steering into wireless equipment having limited space and/or complex shapes.

In a second aspect, the present disclosure relates to the implementation of steerable beam antenna arrays using leaky-wave antennas (LWAs). Leaky-wave antennas are well known and documented in the art. Conventional leaky wave antennas differ from resonant antennas in that radiation emanates from a travelling wave across the conductor of the antenna. Leaky-wave or fast-wave types propagate surface travelling waves with a phase velocity faster than the speed of light in the free-space, resulting in continuous radiation along the length.

This type of radiating mode forms highly directed beams with small side-lobes, at angles controlled by the phase constant. The phase constant changes with the frequency and therefore, in conventional mode, the beam angle is frequency-dependent.

This conventional operation of leaky-wave antennas has meant that beam steering arrays and use of MIMO has required complicated circuitry to compensate for the frequency dependence or use of more traditional and complex phase techniques.

Viewed from a second aspect, there is provided an antenna array for a portable electronic device, the antenna array comprising:

a plurality of leaky-wave antennas;

a plurality of control networks each comprising a plurality of impedance matching circuits and RF switches, each leaky-wave antenna being connected to a respective control network; and a digital control processor configured to send control signals to the control networks so as to control operation of the leaky-wave antennas;

wherein each control network connects its respective leaky-wave antenna to a single RF port.

Each leaky-wave antenna may comprise a leaky-wave radiating portion provided with at least two tuneable circuit components distributed along the leaky-wave radiating portion. The tuneable components, which may be LC-type components, may be distributed along the leaky-wave radiating portion with substantially even spacing, or in some embodiments with substantially uneven spacing. The tuneable components may comprise inductors and/or capacitors and/or networks thereof.

In some embodiments, the tuneable components may comprise or be configured as non-Foster networks. Such non-Foster networks may be configured to present negative capacitances and/or negative inductances.

The tuneable components may comprise both inductors and/or capacitors and/or networks thereof, and also non-Foster networks, in series and/or parallel arrangements.

In other embodiments, for example those employing half-width leaky-wave antennas such as disclosed in co-pending UK patent application no GB170881 1.3, the tuneable components may comprise RF switches and/or varactors.

The control networks may be configured to be addressed directly by a digital control bus and the digital control processor. In some embodiments, the tuneable circuit components are configured to be controlled by the digital control processor.

The tuneable circuit components may be configured to decouple a frequency dependence of a main lobe angle of a radiation pattern generated by each antenna.

The leaky-wave antennas may be disposed radially about an origin in 3D space. For example, the leaky-wave antennas may be arranged in a substantially orthogonal configuration to form a substantially spherical array.

Alternatively, the leaky-wave antennas may be disposed in a substantially linear arrangement.

Each leaky-wave antenna may be provided with a proximity sensor in a similar manner as described above in relation to the first aspect. The proximity sensor may be configured for connection to the digital control processor. A transmission power of each leaky-wave antenna may be controllable as a function of an output of its associated proximity sensor.

Certain embodiments of the present disclosure employ non-Foster components to uncouple the frequency dependence from the beam angle or the main radiation lobe angle. Using tuneable components, arranged on the antenna element surface, the beam angle can be steered, whilst maintaining the operating frequency.

Other embodiments may use switches or varactors to change the beam angle.

5G millimetre wave communication requires a high gain steerable antenna beam to link the base station and mobile device. For a mobile device, it might be too complicated and power consuming to use conventional beam steering configurations, where multiple phase shifters, low noise amplifiers and power amplifiers are connected to each radiation element through complicated feeding networks.

In embodiments of the present disclosure, LWA (leaky wave antennas) antennas are series fed, which is much simpler, more compact and cost effective than traditional beam steering implementations.

Advantageously, the operating frequencies may be decoupled from the radiation angle by the use of non-Foster components.

Certain embodiments provide a cost-effective way to enable beam steering without the need for typical complex phase, frequency and power amplifier circuitry

BRIEF DESCRIPTION OF THE DRAWINGS

Embodiments of the invention are further described hereinafter with reference to the accompanying drawings, in which.

DETAILED DESCRIPTION

Figure 1:
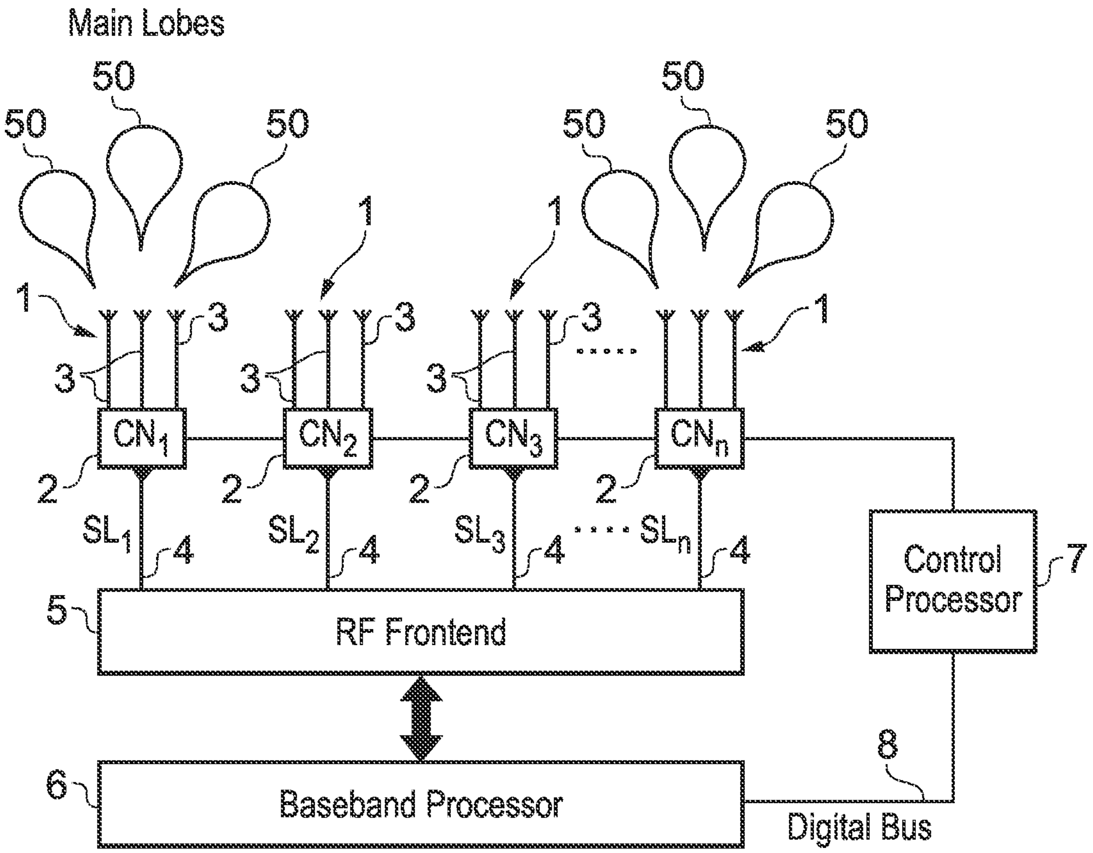
FIG. 1 is a schematic outline of a high-level system architecture of an embodiment of the first aspect.

To explain the concept in further detail, reference is now made to FIG. 1 which illustrates a high-level block representation of the system architecture according to the first aspect of the present disclosure.

The antenna array is formed from antenna elements 1, each with an associated switching and matching network 2 ($CNrCN_n$). Each antenna element 1 further comprises a number of radiating portions 3. Radio frequency signals are passed and received from the antenna elements 1 via RF signal lines 4 ($SI\_i\text{-}SL_n$) which are connected to an RF frontend 5 and ultimately to a baseband processor 6.

Control of the array is achieved via a control processor 7, which can be a microprocessor executing code, a field-programmable gate-array, or other processing module. This enables information communicated from the baseband processor 6 over a digital control bus 8 to be processed and digital control signals sent to the array for control of the switching and matching networks 2 ($CNrCN_n$).

Each antenna element 1 may form a radiation pattern with differently-directed main lobes 50 depending on how the antenna element 1 is controlled. It should be noted that the radiation lobes 50 in the diagram are for illustrative purposes only and give an indication of how the main lobe angle may be altered using this technique.

Describing the individual antenna elements 1 forming the array, one such arrangement could be a linear array of antennas 1, as indicated in the system diagram FIG. 1, or even a circular arrangement, or other shape where all antennas 1 are aligned in the same direction. However, this is not the only configuration of how antenna elements 1 can be arranged in three-dimensional space. For example, the antennas 1 may be arranged with radial radiating elements 3, or the antennas 1 themselves may be spaced radially about an origin.

Figure 2:
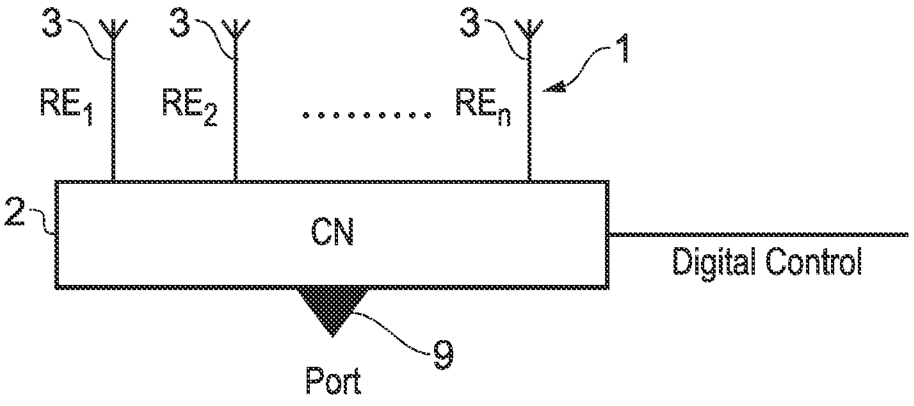
FIG. 2 is a schematic representation of an antenna element of the FIG. 1 embodiment.

FIG. 2 illustrates an individual antenna element 1 of the array in more detail.

Each antenna element 1 comprises two or more radiating elements 3 ($REi\text{-}RE_n$). Using the associated switching and matching network 2 (CN), it is possible to provide one port 9 for transmitting and receiving RF signals. The switching and matching network 2 uses a network of impedance matching and RF switch components (see FIGS. 8 and 9) to enable tuning of the radiating elements 3 and selection of individual radiating elements 3 or groups of radiating elements 3 to be coupled to the feed port 9, depending on the mode of operation.

For example, one antenna element 1 may be composed of two radiating elements 3. This configuration would allow driving of one radiating element 3 in an unbalanced configuration, or two radiating elements 3 separately in an unbalanced configuration by the relevant switching and matching. In addition, another mode of operation may use the matching and switching network 2 to couple the radiating elements 3 through a balun, or otherwise provide a balanced feed, to enable their operation as one balanced antenna, utilising both radiating elements 3. This type of configuration of each antenna element 1 can be dynamically changed in response to the control signal from the control processor 7.

Figure 3:
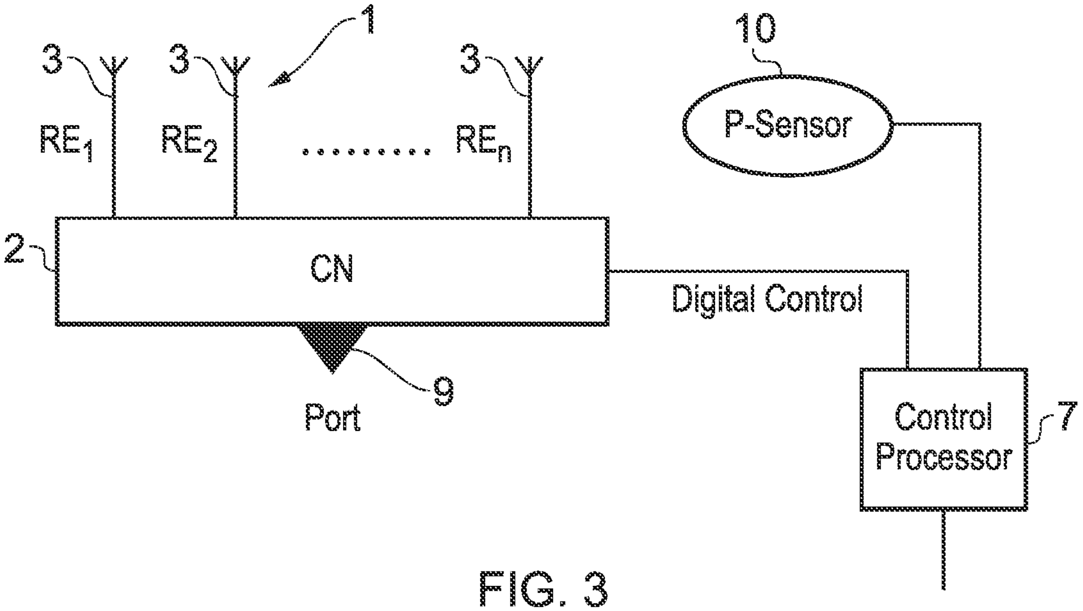
FIG. 3 is a schematic representation of an alternative antenna element with a proximity sensor.

FIG. 3 illustrates another embodiment of the antenna element 1 proposed in this disclosure.

In response to the international legislation on limits for specific absorption rates (SAR) for wireless devices, techniques are being used to actively manage the amount of radiation being directed into human tissue. One such technique uses sensors to detect whether human tissue is near to an emitter and actively shutting down a particular emitter, or reducing the output power. Such sensors could be selected from optical, infra-red (heat), capacitive or other to provide a reliable indication of the approach and distance to a human body from the antenna.

Embodiments of the present disclosure may employ a proximity sensor 10 (P-Sensor) located in the near vicinity, or even forming part of the radiation element 3 structure, in the case of a capacitive sensor. The sensor 10 is connected to the control processor 7 such that in response to a particular value or threshold of values, the digital control to the antenna elements 1 can be altered such that one or all of the following are achieved:

1) radiating element 3 configuration is changed;

2) power transferred from the RF frontend 5 is lowered; and/or 3) the antenna element 1 is switched off altogether.

This enables dynamic power, radiation pattern and active antenna element 1 reconfiguration in response to human tissue in the near environment.

Describing the individual antenna elements 1 forming the array, one such arrangement may be a linear array, as indicated in the system diagram FIG. 1.

Figure 4:
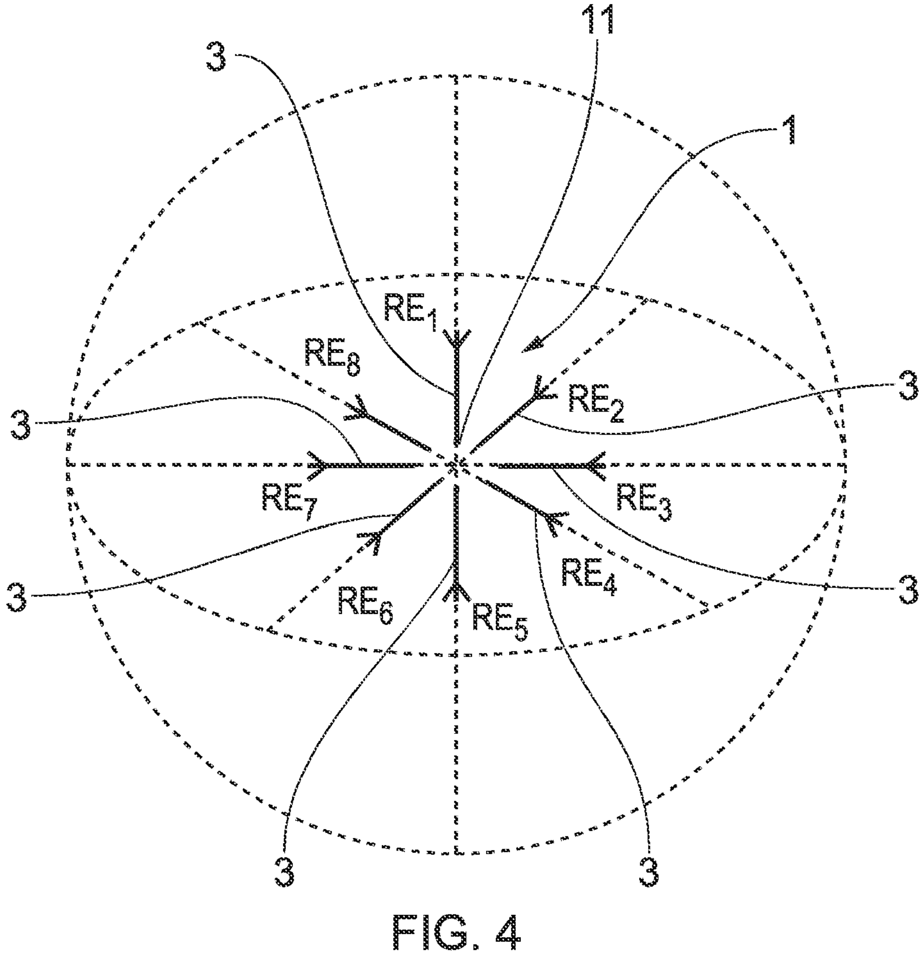
FIG. 4 shows a schematic orthogonal arrangement of eight radiating elements about an origin.

However, a linear arrangement is not the only configuration of radiating elements 3 in space. Reference is now made to FIG. 4, which details how radiating elements 3 can also be arranged in three-dimensional space.

Each antenna element 1 comprises a number of radiating elements 3 (REi-RE$_n$). These elements 3 can be conductive metal elements, metallisation on PCB, foil on flexible carrier, deposited metal on a carrier (LDS) or any other common method for forming antenna radiating elements 3. For this example, eight radiating elements 3 have been chosen, pairs of elements 3 representing each orthogonal axis in three-dimensional space, but further elements 3 can be configured in the space, centred on an origin 11.

Describing the individual antenna elements 1 forming the array, one such arrangement may be a linear array of antennas 1, as indicated in the system diagram FIG. 1, or even a circular arrangement, or other shape where all antennas 1 are aligned in the same direction. However, this is not the only configuration of how antenna elements 1 can be arranged in three-dimensional space.

There is now provided an example of how the broad concept outlined here may be put into practice in a wireless device such as a laptop screen or tablet.

This embodiment provides a real-world example of how the general principle of the present disclosure may be put into in practice in order to illustrate some of the more general concepts in a tangible way. It should not be used to limit the protection afforded by any claims on the general concept. In particular, the method and apparatus of the present disclosure may also be utilised in Wireless Access Points, mobile phones, cellular telecommunications infrastructure such as femtocells, small internet-of-things (IoT) type devices, or anywhere where wireless beam-steering is required.

The current generation of laptops, tablet and mobile phone devices have fully metallic or part metallic cases, in line with current aesthetic desires of users and fashion. This ultra-thin body type makes it inherently difficult to transmit and receive signals using standard internal antenna devices and has little space to add extra components. As such it is desired that features of the metal casing can be utilised to perform operations of an antenna device.

It is known from theory and practice that unbalanced and balanced antenna elements have different radiation patterns. This property, in conjunction with the configuration of the antenna elements, and by driving them as either balanced or unbalanced, means that changes in radiation pattern can be used to beam steer.

The present example addresses the problem of providing beam-steering within the confines of a tablet or laptop screen bezel where space for an antenna array is limited, as is the spacing for isolation, for example between elements or to the ground plane.

The solution described below relates to the use of the metallic casing to form the antenna elements, as would be the case in most high-end devices where elements are formed in the casing through appropriate slots to separate conducting strips. Reference is also made to the present Applicant's co-pending application GB2529885A describing such an arrangement of casing antenna elements, the disclosure of which is hereby incorporated into the present application by reference.

Figure 5:
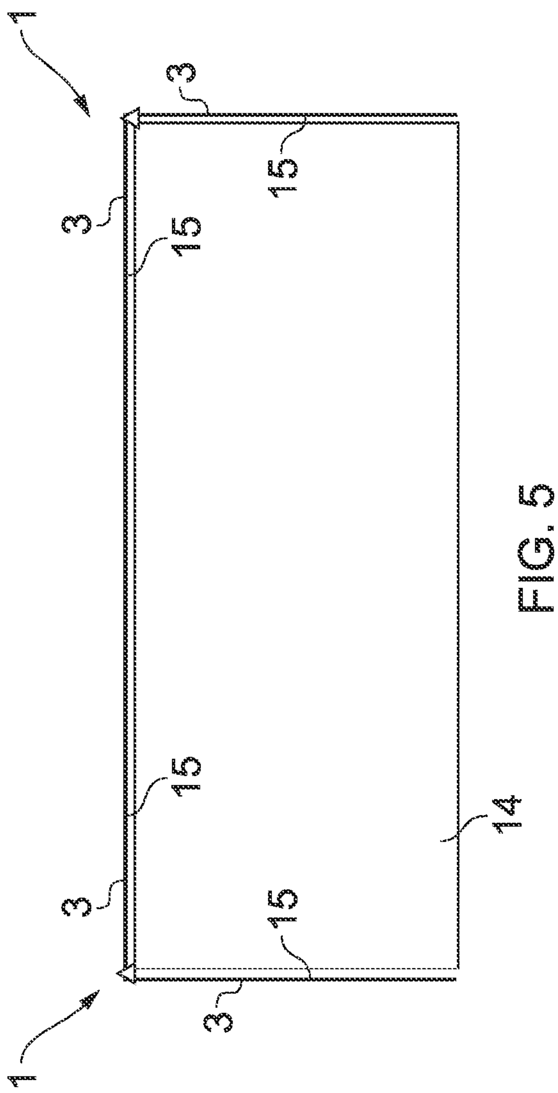
FIG. 5 shows a specific embodiment in schematic form arranged at one end of a ground plane of a portable device.

An exemplary 2×2 beam-steering solution utilises antenna arrangements of the present disclosure positioned at each of the top corners of the laptop or tablet screen as shown in FIG. 5. This technique can equally be extended to other arrangements such 4×4 where there are antennas at each corner of the screen.

The antennas 1 are formed at the corners of the casing using appropriate slots to define conductive strips. Each antenna 1 has two radiating elements 3: one running parallel to the top edge of the screen/ground plane 14 and one running down the side. Each radiating element 3 terminates in a ground point 15 to form a loop with the ground plane 14. The ground plane 14 in a tablet is normally found on the motherboard in a central location. In a laptop screen, the ground plane 14 is generally located on the screen driver daughterboard, or the metal casing back of the LCD module.

Figure 6B:
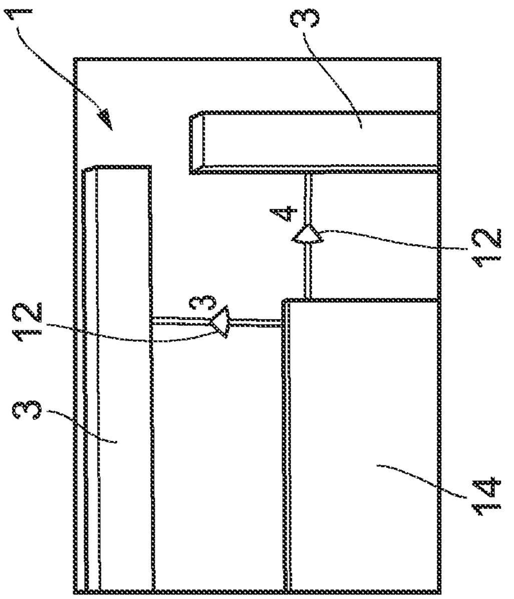
FIGS. 6A and 6B shows the corners of the embodiment in FIG. 5 in more detail.
Figure 6A:
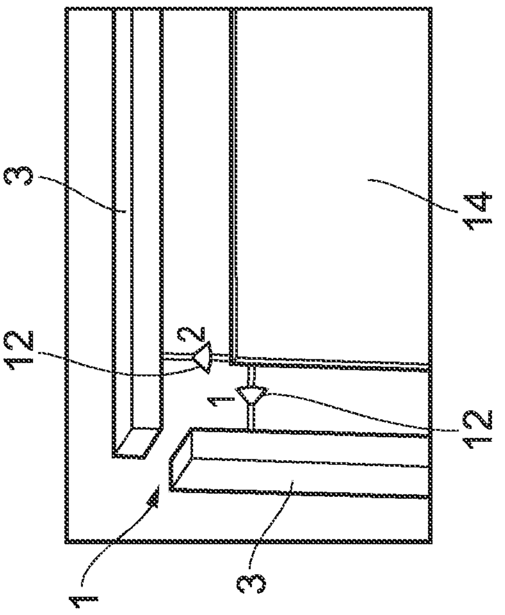

FIG. 6A illustrates a close up of one of the corner antenna elements 1 with two radiating portions 3 each with an associated feed 12. FIG. 6B illustrates a close up of the other corner antenna element 1 with two radiating portions 3 each with an associated feed 3.

Figure 7:
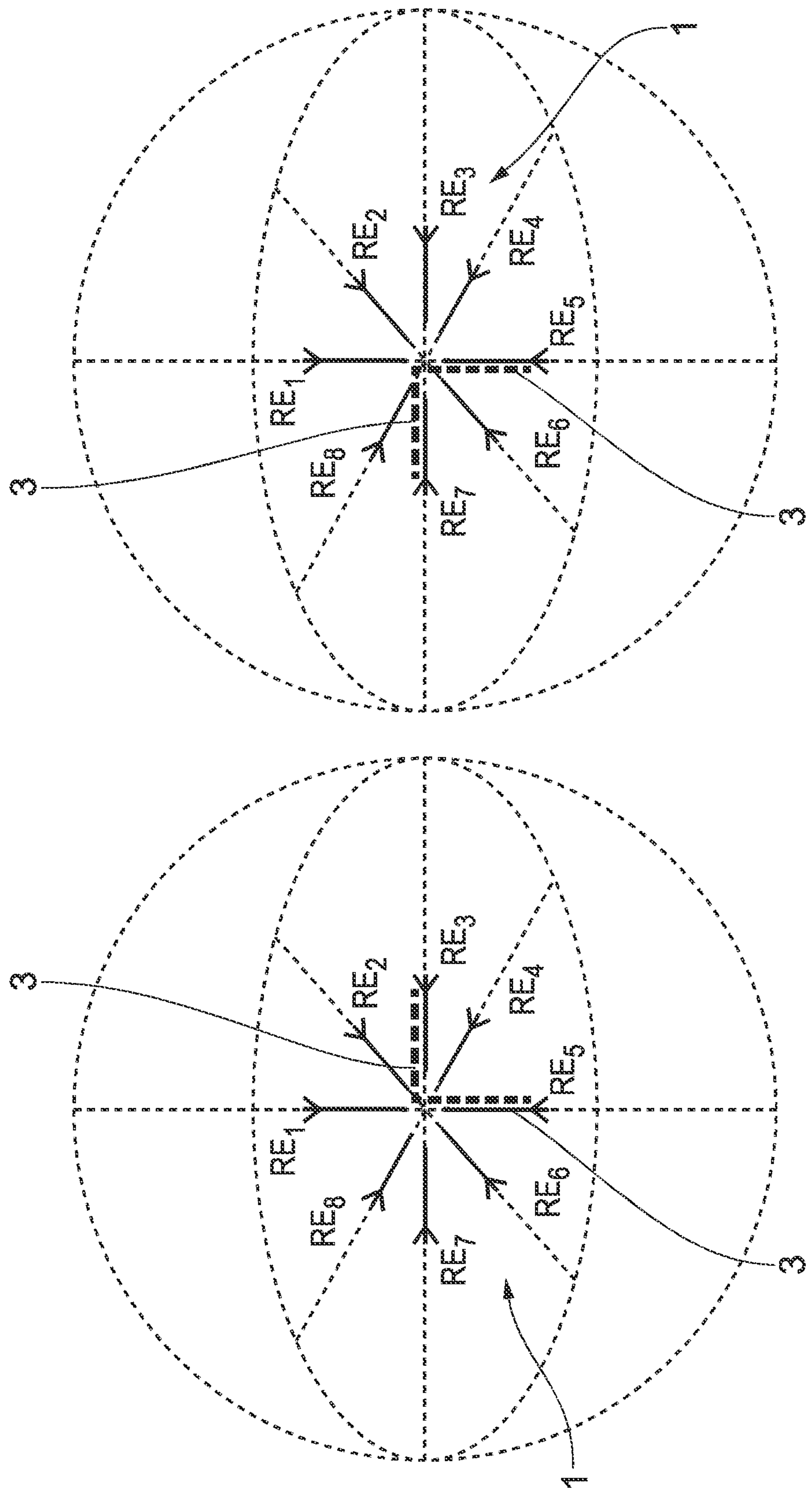
FIG. 7 shows a schematic outline of a radiating element configuration for 2×2 MIMO operation.

This configuration represents a selection of orthogonal radiating elements 3 RE5-RE3 and RE5-RE7 from the 3D arrangement of radiating elements 3 shown in FIG. 4 to form antenna elements 1 to form a 2×2 MIMO array as shown in FIG. 7. It should be noted that in examples of other shapes of devices, then other arrangements of the radiating elements 3 in space may be more appropriate.

The antenna arrangement can be driven as a dipole (or balanced antenna), or each radiating element 3 can be addressed individually forming monopoles, or unbalanced chassis antennas. The chassis antennas form surface currents on the ground plane 14 to assist in radiating. Isolation is enhanced between the separate antennas 1 by the loop arrangements with the ground plane 14. This means that the unbalanced mode will only create localised surface currents on the ground plane 14 and these will not significantly interact with any of the other corner antenna arrangements 1. Similarly, the loop balanced antenna 1 will not be able to interact significantly with neighbouring elements 3 due to the termination of the radiator 3 by the formation of the ground loop.

A simple driving circuit arrangement for the 2×2 example discussed above may take the form shown in FIG. 8.

Figure 8:
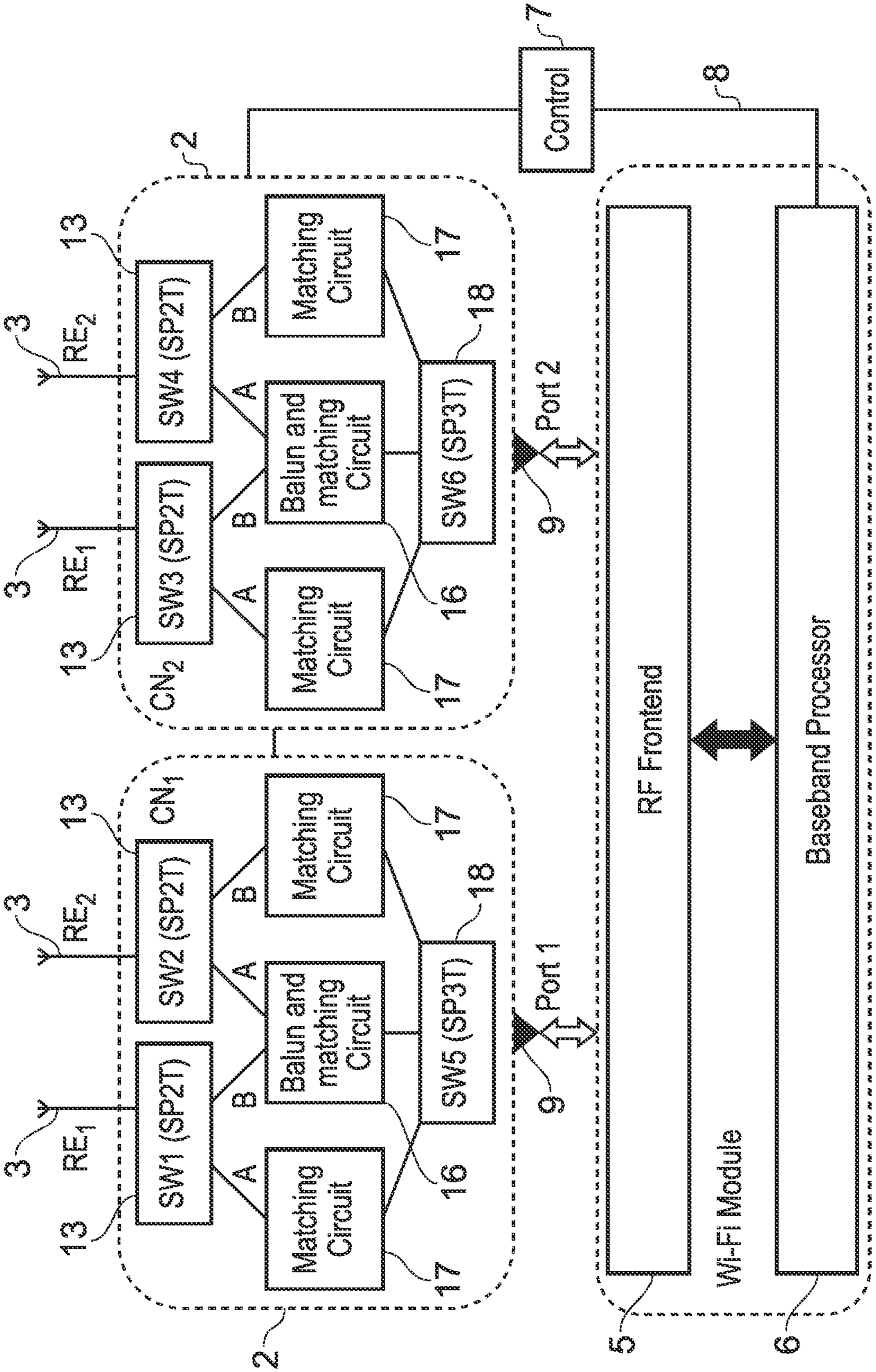
FIG. 8 shows a schematic outline of a specific embodiment including matching circuits, RF switches, an RF frontend and baseband processor.

The system shown in FIG. 8 comprises the two orthogonally-arranged radiating elements 3 situated in the top corners of the laptop screen or tablet casing, forming an L-shaped arrangement. Each radiating element 3 is controlled by a single-pole, double-throw RF switch 13 (SW1, SW2, SW3, SW4) to select whether it will operate as an unbalanced or a balanced element. In the case of the balanced (BA) mode both switches 13 route the signal to a balun and matching circuit 16 (position B and A respectively). For selection of one of the unbalanced modes, one of the switches 13 routes to a matching circuit 17 (A for REi or B for RE2) and the other switch 13 is put into the off position.

Figure 9:
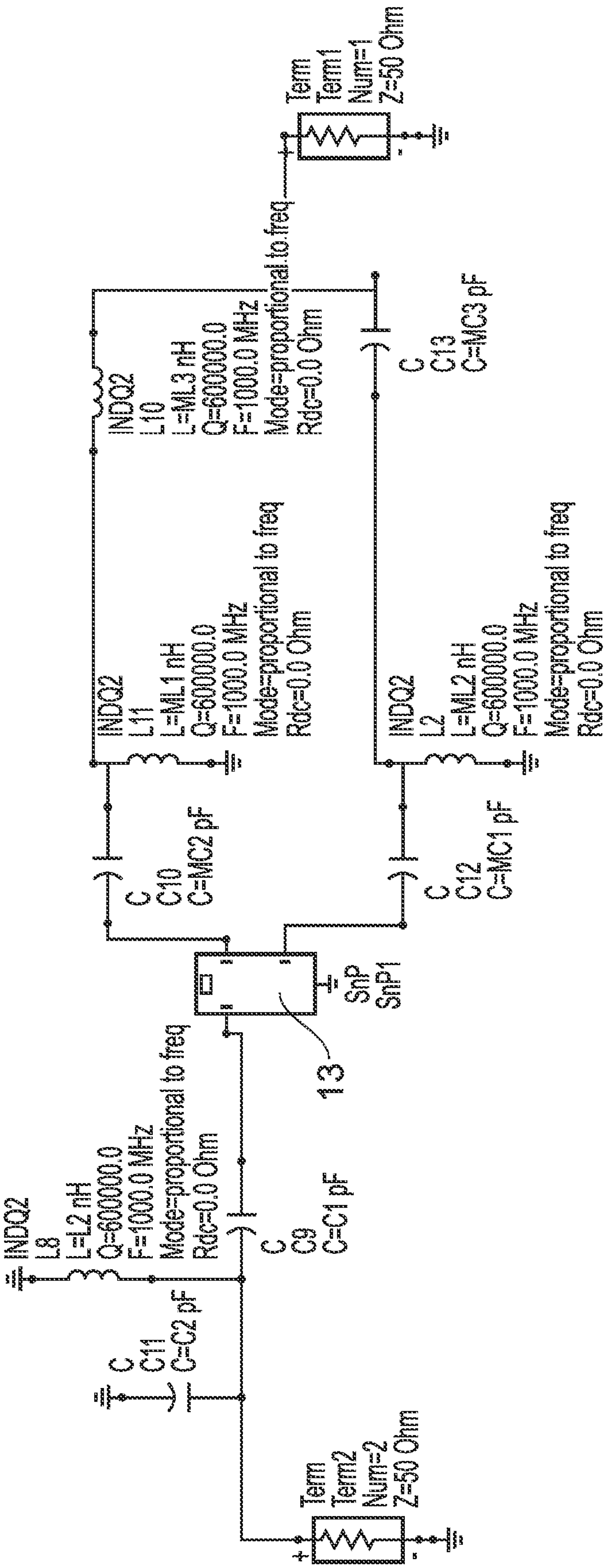
FIG. 9 shows a detail of an RF switch, matching circuit and combined matching circuit and balun.

Suitable matching circuits 16, 17 for this specific example are summarised in FIG. 9.

The circuit branch on the left side of the switch 13 (SnP1) corresponds to the matching circuit 17 for the unbalanced radiating element 3. The circuit branch on the right side of the switch 13 (SnP1) corresponds to the matching circuits 16 for the balanced mode for the radiating elements 3. These utilise standard inductive and capacitive networks as known in the art.

Another single-pole, three-throw switch 18 (SW5, SW6) links the matching circuits 16, 17 to the antenna port 9, this ensures that only one antenna mode is allowed per switching. For example, only the use of both radiators 3 for balanced mode (BA), or one or the other, but not both, radiating elements 3, for the chassis mode (CA).

There are many possible switching states; only the useful and permitted states that are used in this system are summarised in Table 1 below.

TABLE 1

2x2 Switch States

| Operating Mode | Sw1 Position | Sw2 Position | Sw3 Position | Sw4 Position |
|---|---|---|---|---|
| Ant1 BA; Ant2 BA | 2 | 1 | 2 | 1 |
| Ant1 BA; Ant2 RE1 CA | 2 | 1 | 1 | 0 |
| Ant1 BA; Ant2 RE2 CA | 2 | 1 | 0 | 2 |
| Ant1 RE1 CA; Ant2 BA | 1 | 0 | 2 | 1 |
| Ant1 RE2 CA; Ant2 BA | 0 | 2 | 2 | 1 |
| Ant1 RE1 CA; Ant2 RE1 CA | 1 | 0 | 1 | 0 |
| Ant1 RE2 CA; Ant2 RE2 CA | 0 | 2 | 0 | 2 |
| Ant1 RE1 CA; Ant2 RE2 CA | 1 | 0 | 0 | 2 |
| Ant1 RE2 CA; Ant2 RE1 CA | 0 | 2 | 1 | 0 |

Using this matrix of possible operating modes, the controller unit 7 is able to select the most appropriate mode based on a metric from the baseband processor 6 such as received signal strength (RSSI). If this is not within a threshold or acceptable range, the controller 7 can switch the mode of a particular antenna element 1 and look at the metric values again. This process can be repeated for each antenna element 1 in the array, in order to switch to the mode providing the most useful beam pattern. This process can be ongoing to allow the array to dynamically switch modes and therefore beam patterns in response to changes in the radio environment nearby.

Figure 10:
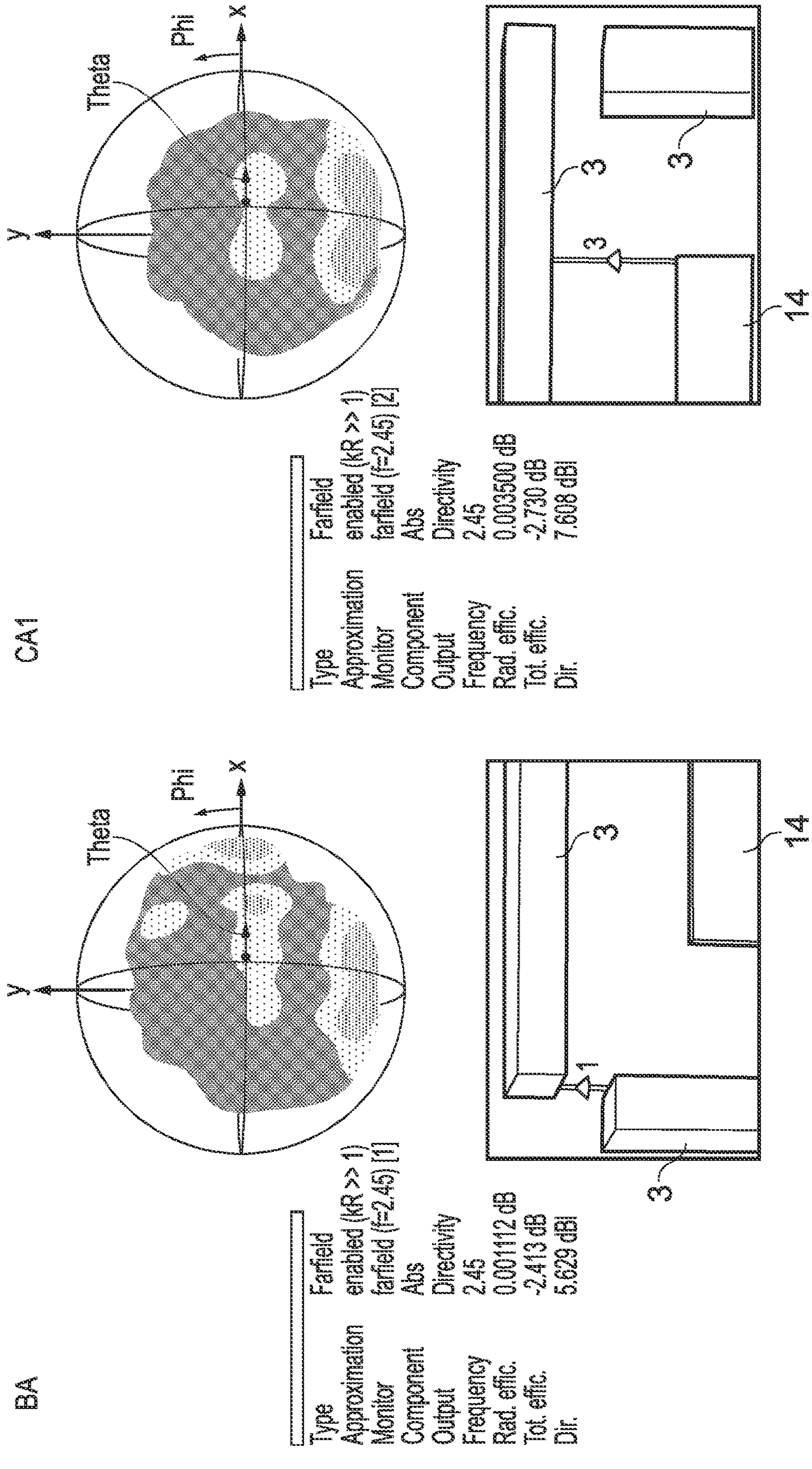
FIG. 10 shows simulated radiation patterns for the antenna array of the FIG. 5 embodiment operated in different modes.
Figure 10:
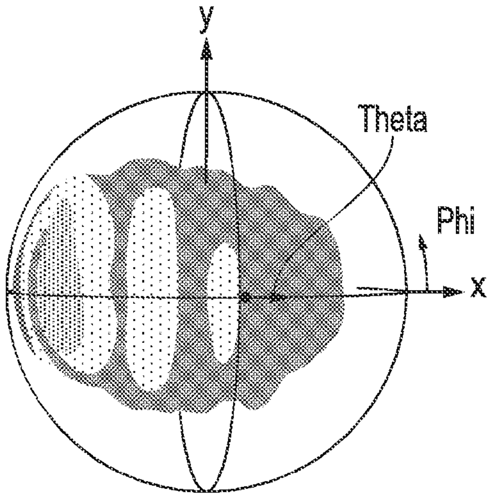
Figure 10:
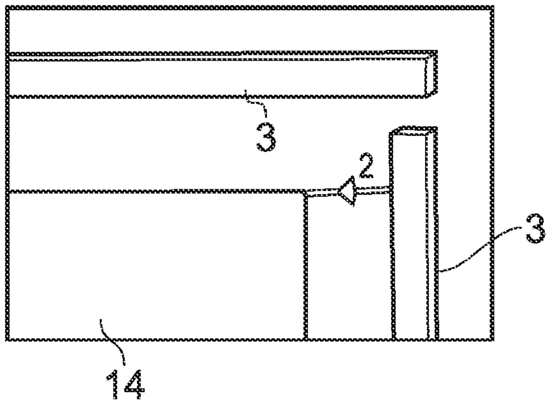

Simulated radiation patterns for three modes of the antenna elements 1 are illustrated in FIG. 10. The first image (BA) shows both radiating elements 3 being driven as a balanced antenna. The main radiation lobes can be identified from the red hotspots on the simulated pattern and therefore this indicates radiation primarily to the right, along the top edge of the screen, and down the side of the screen. The second image (CA1) shows where only the top radiation element 3 (of the opposite corner) is being driven as chassis mode, with a main lobe down the edge of the screen. The third image (CA2) shows the remaining radiation element 3 being driven in chassis mode, with a main lobe direction to the left along the top of the screen. These results provide an indication of how the beam pattern can be steered by changing the active radiating element 3 or changing the antenna mode from unbalanced to balanced.

Figure 11:
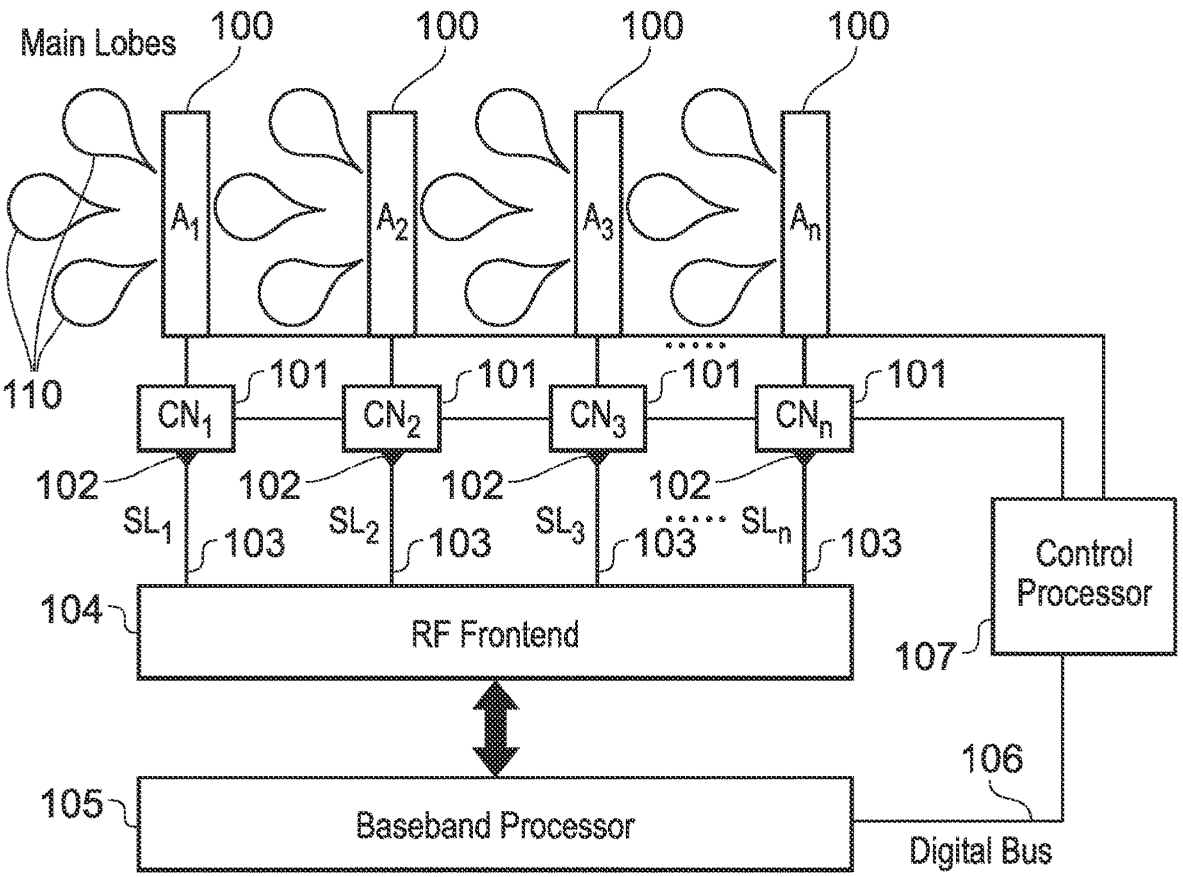
FIG. 11 is a schematic outline of a high-level system architecture of an embodiment of the second aspect.

Turning now to the second aspect of the present disclosure, and to explain the concept in further detail, reference is now made to FIG. 11 which illustrates a high-level block representation of the system architecture according to the second aspect.

The antenna array is formed from leaky-wave antenna elements 100 (A1-An), each with an associated switching and matching network 101 (CN1-CNn) which enables the antenna element 100 to be addressed through a single port 102. Each antenna element 100 further comprises a leaky-wave radiating portion with tuneable components (see FIG. 12). Radio frequency signals are passed and received from the antenna elements 100 via RF signal lines 103 (SL1-SLn) which are connected to an RF frontend 104 and ultimately a baseband processor 105.

Control of the array is achieved via a control processor 107, which can be a microprocessor executing code, a field-programmable gate-array, or other processing module. This enables information communicated from the baseband processor 105 over a digital bus 106 to be processed and digital control signals sent to the array for control of the switching and matching networks 101 (CN1-CNn) and the tuneable components (LC1-LCn) on each antenna 100 (A1-An).

Each antenna element 100 may form a radiation pattern with differently-directed main lobes 110 depending on how the antenna element 100 is controlled.

Figure 12:
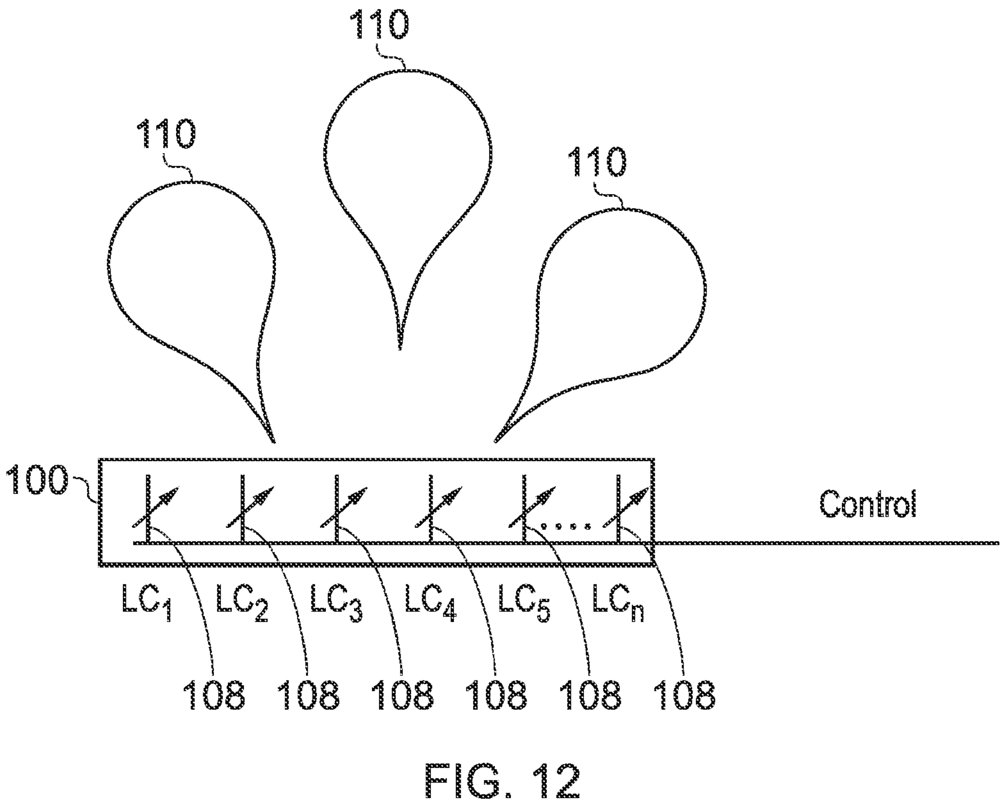
FIG. 12 is a schematic representation of an antenna element of the FIG. 11 embodiment.

FIG. 12 illustrates the individual antenna elements 100 that make up the array in more detail.

Each antenna element 100 comprises two or more tuneable components 108 (LC1-LCn). It should be noted that the radiation lobes 110 in the diagram are for illustrative purposes only and give an indication of how the main lobe angle may be altered using this technique. The configuration of the associated switching and matching network 101 (CN) means it is possible to provide one port 102 for transmitting and receiving RF signals. The switching and matching network 101 uses a network of impedance matching and RF switch components (not shown) to enable tuning of the radiating elements 100, depending on the mode of operation.

For example, one antenna element 100 may be configured with a number of tuneable components 108 (LC1-LCn). The tuneable components 108 are distributed in or along the radiator element 100, in order to change the effective dielectric constant. This results in altering the travelling wave speed, and thus the beam angle. Depending on the beam angle and shape requirement, the components 108 can be tuned to different values independently or simultaneously tuned to the same value in response to a control signal.

This type of configuration of tuneable components 108 in each antenna element 100 can be dynamically changed in response to a control signal from the control processor 107. The control processor 107 is able to select the most appropriate mode based on a metric from the baseband processor 105 such as received signal strength (RSSI). If this is not within a threshold or acceptable range, the controller 107 can switch the mode of a particular antenna element 100 and look at the metric values again. This process can be repeated for each antenna element 100 in the array, in order to switch to the mode providing the most useful beam pattern 110. This process can be ongoing to allow the array to dynamically switch modes and therefore beam patterns 110 in response to changes in the radio environment nearby.

Figure 13:
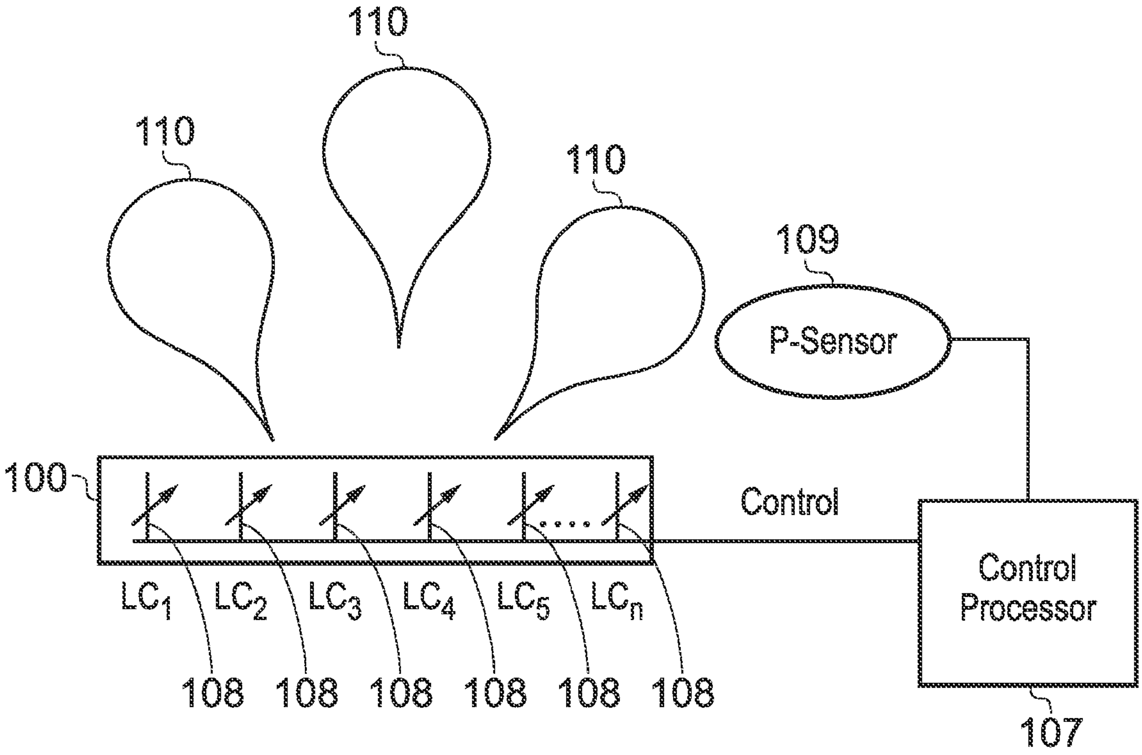
FIG. 13 is a schematic representation of an alternative antenna element with a proximity sensor.

FIG. 13 illustrates another embodiment of the antenna element 100 of the present disclosure.

In response to the international legislation on limits for specific absorption rates (SAR) for wireless devices, techniques are being used to actively manage the amount of radiation being directed into human tissue. One such technique uses sensors to detect whether human tissue is near to an emitter and actively shutting down a particular emitter, or reducing the output power. Such sensors could be selected from optical, infra-red (heat), capacitive or other to provide a reliable indication of the approach and distance to a human body from the antenna.

Embodiments of the present disclosure may employ a proximity sensor 109 (P-Sensor) located in the near vicinity, or even forming part of the radiation element structure, in the case of a capacitive sensor. The sensor 109 is connected to the control processor 107 such that in response to a particular value or threshold of values, the digital control to the antenna element 100 can be altered such that one or all of the following are achieved:

1) tuneable component 108 configuration is changed;

2) power transferred from the RF frontend 104 is lowered; and/or 3) the antenna element 100 is switched off altogether.

This enables dynamic power, radiation pattern and active antenna element 100 reconfiguration in response to human tissue in the near environment.

With regard to the tuneable components 108, which are arranged on the antenna element 100, one such arrangement may be a linear array with components 108 distributed with equal spacing along the length of the radiating element 100 (in the direction of the travelling wave). However, a linear arrangement of equally spaced components 108 is not the only useful configuration of the tuneable components 108.

Figure 14A:
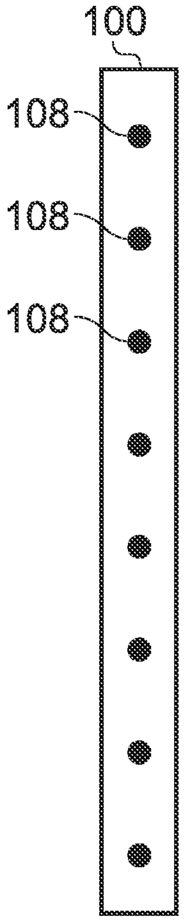
FIGS. 14A and 14B are schematic views of arrangements of tuneable components on leaky-wave antennas.
Figure 14B:
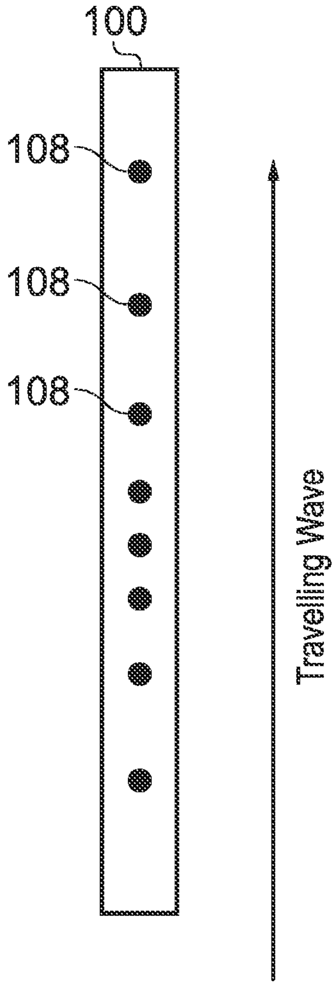

Reference is now made to FIG. 14 which details some useful configurations of the tuneable components 108 on the antenna element 100. FIG. 14A indicates the equal spacing configuration, while FIG. 14B illustrates where the tuneable components 108 are arranged linearly but without equal spacing, the distance between adjacent elements 108 can vary along the length of the antenna element 100. It should additionally be noted that the components 108 can also be displaced in a direction perpendicular (to the travelling wave), provided that the arrangement is substantially linear along the length of the antenna element 100.

Suitable tuneable components 108 for use in embodiments of the present disclosure include both conventional inductances and capacitances or networks thereof, or those of non-Foster type, such as negative capacitances or negative inductances, or combinations of both in series or parallel arrangements. At least one of the components 108 may be variable, in order to enable the tuneable element or network, in that location on the antenna 100, to be controlled or configured using the control processor 107.

Leaky-wave antennas are usually driven in an unbalanced mode. However, they can be driven using a balanced feed, and this is also a possible mode for the array described in the present disclosure.

Describing the individual antenna elements 100 forming the array, one such arrangement could be a linear array of leaky-wave antennas 100, as indicated in the system diagram FIG. 11, or even a circular arrangement, or other shape where all antennas are aligned in the same direction. However, this is not the only configuration of how antenna elements 100 can be arranged in three-dimensional space.

Figure 15:
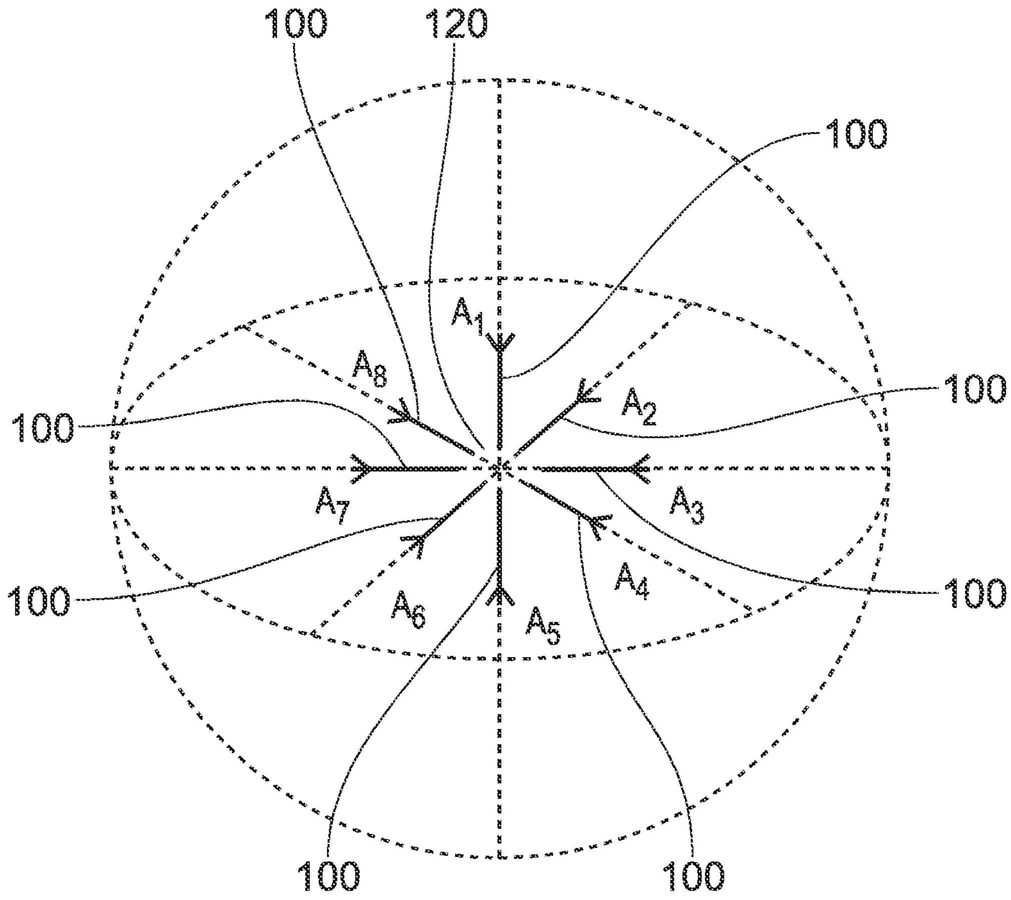
FIG. 15 shows a schematic orthogonal arrangement of eight leaky-wave antennas about an origin.

With reference to FIG. 15, this shows how the leaky wave antennas 100 may also be arranged in three-dimensional space. For this example, eight antennas 100 have been chosen, two representing each orthogonal axis in three-dimensional space, but further antennas 100 can be configured in the space, centred on an origin 120.

Throughout the description and claims of this specification, the words “comprise” and “contain” and variations of them mean “including but not limited to”, and they are not intended to (and do not) exclude other moieties, additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed.

The reader’s attention is directed to all papers and documents which are filed concurrently with or previous to this specification in connection with this application and which are open to public inspection with this specification, and the contents of all such papers and documents are incorporated herein by reference.

The invention claimed is:

1. An antenna array for a portable electronic device, the antenna array comprising:

at least two antennas, each antenna comprising at least two radiating elements; and at least two control networks each comprising a plurality of impedance matching circuits and RF switches, each antenna being connected to a respective control network;

wherein each control network connects the radiating elements of a respective antenna to a single RF port; and wherein each control network is configured to allow selectable connection of each radiating element to the single RF port by way of different matching circuits.

2. The antenna array as claimed in claim 1, wherein each radiating element is connected to a respective first RF switch in the respective control network allowing selection between different ones of the plurality of impedance matching circuits;

wherein each port is connected to a respective second RF switch in the respective control network allowing selection between different ones of the plurality of impedance matching circuits; and wherein the impedance matching circuits are connected between the first RF switches and the second RF switch in each control network.

3. The antenna array as claimed in claim 1, wherein the control network is configured to be addressed directly by a digital control bus and an associated digital control processor.

4. The antenna array as claimed in claim 1, wherein the radiating elements are disposed radially about an origin in 3D space.

5. The antenna array as claimed claim 1, wherein the radiating elements are disposed in a substantially linear arrangement.

6. The antenna array as claimed in claim 1, wherein the radiating elements are arranged conformally within a portable device casing.

7. The antenna array as claimed in claim 1, wherein the radiating elements are configured as one or more of: i) free-standing metal conductors, ii) conductive patterns on a dielectric carrier using laser direct structuring techniques, or iii) conductive patterns on a flexible PCB, wrapped onto a dielectric carrier.

8. The antenna array as claimed in claim 1, wherein each antenna is provided with a proximity sensor.

9. The antenna array as claimed in claim 8, wherein the proximity sensor is configured for connection to the digital control processor.

10. The antenna array as claimed in claim 9, wherein a transmission power of each antenna is controllable as a function of an output of an associated proximity sensor.

11. The antenna array as claimed in claim 3, wherein the digital control processor is configured to operate the control networks so as to allow the radiating elements to be driven either in an individual mode as unbalanced or chassis antennas, or in a combination mode as a balanced or dipole antenna.

12. The antenna array as claimed in claim 11, wherein the digital control processor is configured to operate the control networks to dynamically change the antenna configuration in response to predetermined factors.

13. The antenna array as claimed in claim 12, wherein the predetermined factors include: specific absorption rate (SAR), total radiated power (TRP), channel quality, error rates, or similar communication strength or quality metrics.

14. The antenna array as claimed in claim 11, wherein switching between the individual mode and the combination mode, or between different combination modes, produces differently-directed beam patterns during operation of the antenna array.

15. The antenna array as claimed in claim 14, wherein the differently-directed beam patterns are configured for beamforming or MIMO applications.

16. The antenna array as claimed in claim 1, wherein each antenna comprises two radiating elements arranged orthogonally to each other so as to fit in a corner of a portable electronic device.

17. The antenna array as claimed in claim 1, wherein the arrangement of at least two antennas is configured to provide 2×2 or 4×4 MIMO in a laptop, tablet, or other mobile wireless device.

18. The antenna array as claimed in claim 16, wherein the two radiating elements are drivable together in a balanced mode, or each drivable individually in an unbalanced mode, so as to radiate with differently-directed beam patterns.

19. An antenna array for a portable electronic device, the antenna array comprising:

a plurality of leaky-wave antennas;

a plurality of control networks each comprising a plurality of impedance matching circuits and RF switches, each leaky-wave antenna being connected to a respective control network; and a digital control processor configured to send control signals to the control networks so as to control operation of the leaky-wave antennas;

wherein each control network connects its respective leaky-wave antenna to a single RF port; and wherein each leaky-wave antenna comprises a leaky-wave radiating portion provided with at least two tuneable circuit components distributed along the leaky-wave radiating portion.

20. The antenna array as claimed in claim 19, wherein the tuneable components are distributed along the leaky-wave radiating portion with substantially even spacing.

21. The antenna array as claimed in claim 19, wherein the tuneable components are distributed along the leaky-wave radiating portion with substantially uneven spacing.

22. The antenna array as claimed in claim 19, wherein the tuneable components comprise inductors and/or capacitors and/or networks thereof.

23. The antenna array as claimed in claim 19, wherein the tuneable components comprise non-Foster networks.

24. The antenna array as claimed in claim 23, wherein the non-Foster networks present negative capacitances and/or negative inductances.

25. The antenna array as claimed in claim 19, wherein the tuneable components comprise both inductors and/or capacitors and/or networks thereof, and also non-Foster networks, in series and/or parallel arrangements.

26. The antenna array as claimed in claim 19, wherein the tuneable components comprise RF switches and/or varactors.

27. The antenna array as claimed in claim 26, wherein the leaky-wave antennas are half-width leaky-wave antennas.

28. The antenna array as claimed in claim 19, wherein the control networks are configured to be addressed directly by a digital control bus and the digital control processor.

29. The antenna array as claimed in claim 19, wherein the tuneable circuit components are configured to be controlled by the digital control processor.

30. The antenna array as claimed in claim 19, wherein the tuneable circuit components are configured to decouple a frequency dependence of a main lobe angle of a radiation pattern generated by each antenna.

31. The antenna array as claimed in claim 19, wherein the leaky-wave antennas are disposed radially about an origin in 3D space.

32. The antenna array as claimed in claim 31, wherein the leaky-wave antennas are arranged in a substantially orthogonal configuration to form a substantially spherical array.

33. The antenna array as claimed in claim 19, wherein the leaky-wave antennas are disposed in a substantially linear arrangement.

34. The antenna array as claimed in claim 19, wherein each leaky-wave antenna is provided with a proximity sensor.

35. The antenna array as claimed in claim 34, wherein the proximity sensor is configured for connection to the digital control processor.

36. The antenna array as claimed in claim 35, wherein a transmission power of each leaky-wave antenna is controllable as a function of an output of an associated proximity sensor.

* * * * *